United States Patent [19]

Ayres et al.

[11] 4,005,967
[45] Feb. 1, 1977

[54] SCRAPLESS FORMING OF PLASTIC ARTICLES

[75] Inventors: Ralph E. Ayres; Kenneth J. Cleereman, both of Midland; Walter J. Schrenk, Bay City, all of Mich.

[73] Assignee: The Dow Chemical Company, Midland, Mich.

[22] Filed: Jan. 21, 1976

[21] Appl. No.: 650,833

Related U.S. Application Data

[62] Division of Ser. No. 433,320, Jan. 14, 1974, Pat. No. 3,947,204, which is a continuation-in-part of Ser. No. 295,092, Oct. 2, 1972, abandoned, which is a division of Ser. No. 62,969, Aug. 11, 1970, Pat. No. 3,739,052.

[52] U.S. Cl. ............... 425/326 R; 425/384; 425/388; 425/394; 425/412; 425/451.9
[51] Int. Cl.² .................. B29C 3/00; B29C 17/04
[58] Field of Search .......... 425/326 R, 324 R, 387, 425/388, 394, 412, 407, 384, 451.9, 398, 406, 195, 437, 383; 264/102, 294, 296, 325, 322, 92

[56] References Cited

UNITED STATES PATENTS

| 2,541,923 | 2/1951 | Huxham | 425/412 |
|---|---|---|---|
| 3,271,501 | 9/1966 | Heck | 425/412 |
| 3,324,511 | 6/1967 | Micai et al. | 425/398 |
| 3,488,805 | 1/1970 | Biglin et al. | 425/243 |
| 3,551,954 | 1/1971 | Knowles | 425/398 |
| 3,695,806 | 10/1972 | Arfert | 425/398 |

Primary Examiner—Robert L. Spicer, Jr.
Attorney, Agent, or Firm—L. E. Hessenaur, Jr.

[57] ABSTRACT

Apparatus for rapidly making thermoplastic containers wherein the resultant containers can, if desired, be multilayered for vapor or gas barrier or other reasons, or be oriented for toughness and improved stress crack resistance. The apparatus takes a measured amount of thermoplastic material which is lubricated, heated and forged into a desired shape preform with a predetermined lip configuration. The center portion of each said preform is maintained at a forming temperature while the peripheral portion thereof is clamped and rapidly brought below the softening point of the plastic resin. The preform can then be immediately thermoformed into a container having a desired shape and size, and cooled. If desired, the preform can be forged, cooled and recovered for a subsequent thermoforming operation or can be a finished article itself.

4 Claims, 12 Drawing Figures

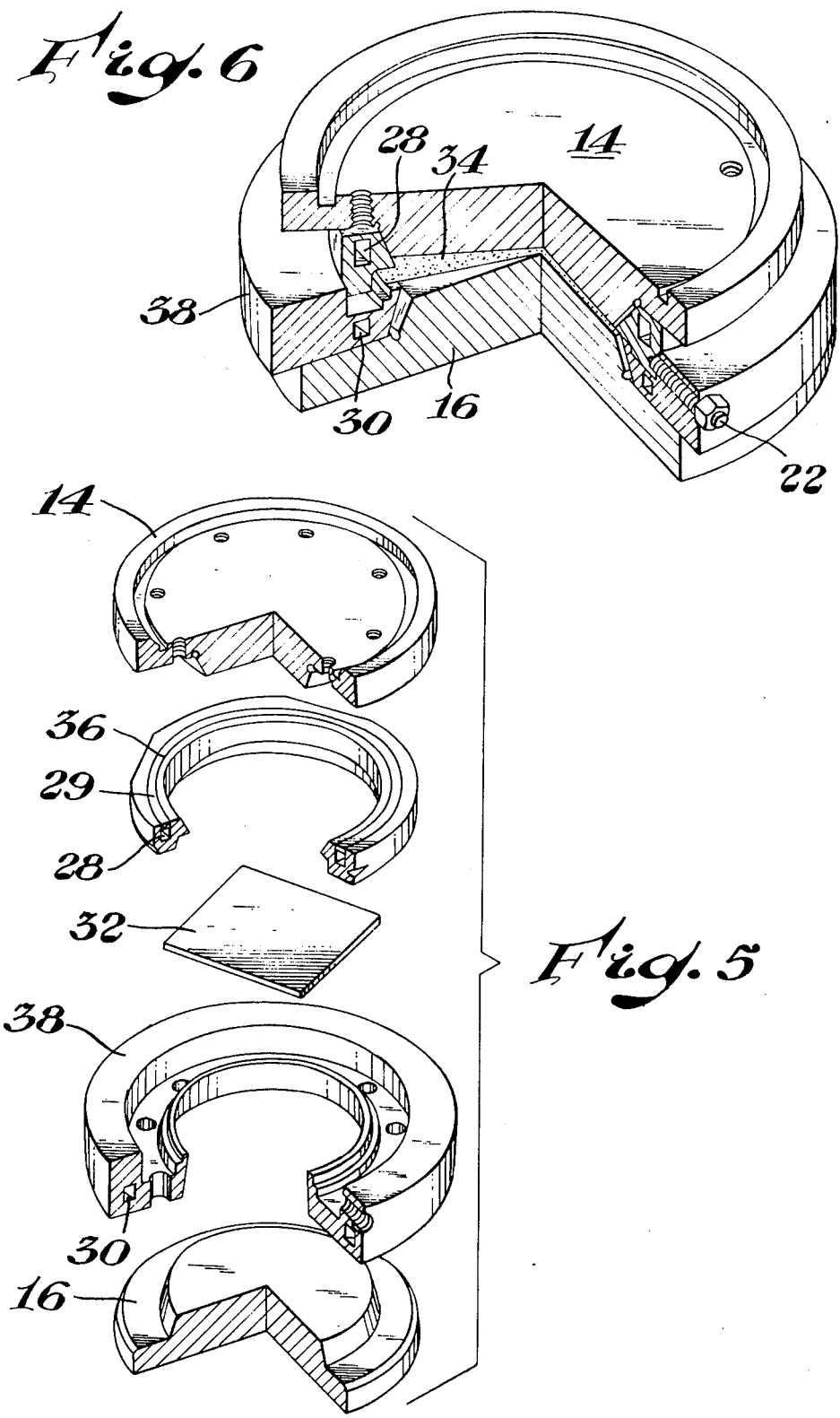

SCRAPLESS FORMING OF PLASTIC ARTICLES

This is a division, of application Ser. No. 433,320 filed Jan. 14, 1974, which is now U.S. Pat. No. 3,947,204, which is a continuation-in-part of application Ser. No. 295,092 filed Oct. 2, 1972, now abondoned, which in turn, is a division of application Ser. No. 62,969, filed Aug. 11, 1970, now U.S. Pat. No. 3,739,052.

BACKGROUND OF THE INVENTION

This invention relates to a high speed process for making thermoplastic containers or other articles wherein a measured amount of thermoplastic material, such as a thermoplastic blank, is forged under proper conditions into a preform having a defined peripheral configuration and then immediately thermoformed into a container to produce the desired container shape having advantageous properties heretofore unobtainable in rapidly thermoformed containers.

It is well known that preforms can be injection molded from a molten polymer and later thermoformed into a thermoplastic container. See, for example, U.S. Pat. Nos. 3,305,158 and 3,488,805. However, no quick forming process for thermoforming scrap free containers using other than an injection molding process has been known. Injection molding processes are severely limited in what can be done in forming the preform and the resultant qualities of the container. For example, the forming of oriented and/or multilayered preforms is not readily and easily accomplished in injection molding processes, and relatively expensive equipment is required.

SUMMARY OF THE INVENTION

The present invention is an improvement over the prior art in that an especially quick process of making a thermoplastic container or other article is achieved, while the process is scrap free and provides a container which can be multilayered and/or oriented where desired. In the process a preform is forged in a matter of seconds with a finished rim and immediately thermoformed into the container while the relatively hot center portion thereof is still at a thermoforming temperature.

The present invention includes the following steps: A measured amount of thermoplastic material, such as a relatively thin thermoplastic blank, is provided. Lubrication is then provided for the surfaces of the blank by directly lubricating the blank or the molds in which the blanks are forged. One of these blanks is then preheated to a temperature ranging from just below the softening point to about the melting point of the plastic resin and immediately forged in a heated mold into a desired shape preform in which the center portion thereof is maintained at its forming temperature while the peripheral portion is rapidly brought below the softening point of the plastic. The preform is then immediately thermoformed into a container having a desired shape and size, and cooled.

Orientation is built into the container through the forging of the preform and/or thermoforming of the containers by this process. A higher degree of orientation can be obtained if the preform is forged directly from oriented blanks; where forging is initiated below the softening point of the blank.

A further aspect of the present invention is the provision wherein a relatively thin thermoplastic blank is provided by dividing a sheet of plastic into a plurality of polygonal blanks having a size and shape such that scrap is minimized or eliminated. It particularly is desirable in this regard to cut the sheet into a series of square blanks. These blanks can then be forged to a desired forming shape such as circular with virtually no scrap.

Another aspect of this invention is the provision wherein blanks are forged in a forging means having a cooled lip forming means therein whereby the forging pressure applied is sufficient to cause the plastic blank to flow uniformly into the lip forming means with a dwell time just sufficient to cause the peripheral part thereof to be clamped securely and brought rapidly below the softening point of said plastic while the center portion is maintained at its forming temperature in the event subsequent thermoforming is desired without reheating.

Other features of the process are that single and multiple layer preforms can be readily contoured to provide more uniform draw of containers, and the preforms can be distortion printed prior to thermoforming.

While a wide variety of thermoplastics can be used in this invention, the invention is particularly applicable to a multilayer sheet of at least two different plastics, for example, wherein the multilayer sheets or laminate consists of two sheets of a polyvinyl aromatic such as styrene, polyvinyl toluene, or rubber modified blends thereof with a core of polyvinylidene chloride (saran). A further useful laminate comprises two sheets of a polyolefin such as polyethylene or polypropylene with a core of polyvinylidene chloride.

The containers formed by this process when a multilayer blank is used containing a core of saran are particularly advantageous in that this process gives a composite wherein the saran layer is essentially pinhole free with no cracks. Hence, the containers are excellent barriers to gases such as oxygen and carbon dioxide, for example, odors, etc. and are useful to package foodstuffs.

The invention is also applicable to the use of a single sheet of plastic such as polyolefin, i.e., polyethylene, polypropylene, etc., and polyvinyl aromatics such as polystyrene, as well as polyvinyl halides such as polyvinyl chloride, etc.

DETAILED DESCRIPTION

The process of this invention is illustrated by the drawings in which:

FIG. 5 is an exploded isometric view of the details of the lip forming fixture in relationship to the blank and the platens of the press;

FIG. 6 is a similar isometric view showing the relationship of the parts after the platens have compressed the blank into a preform;

Figure 1:
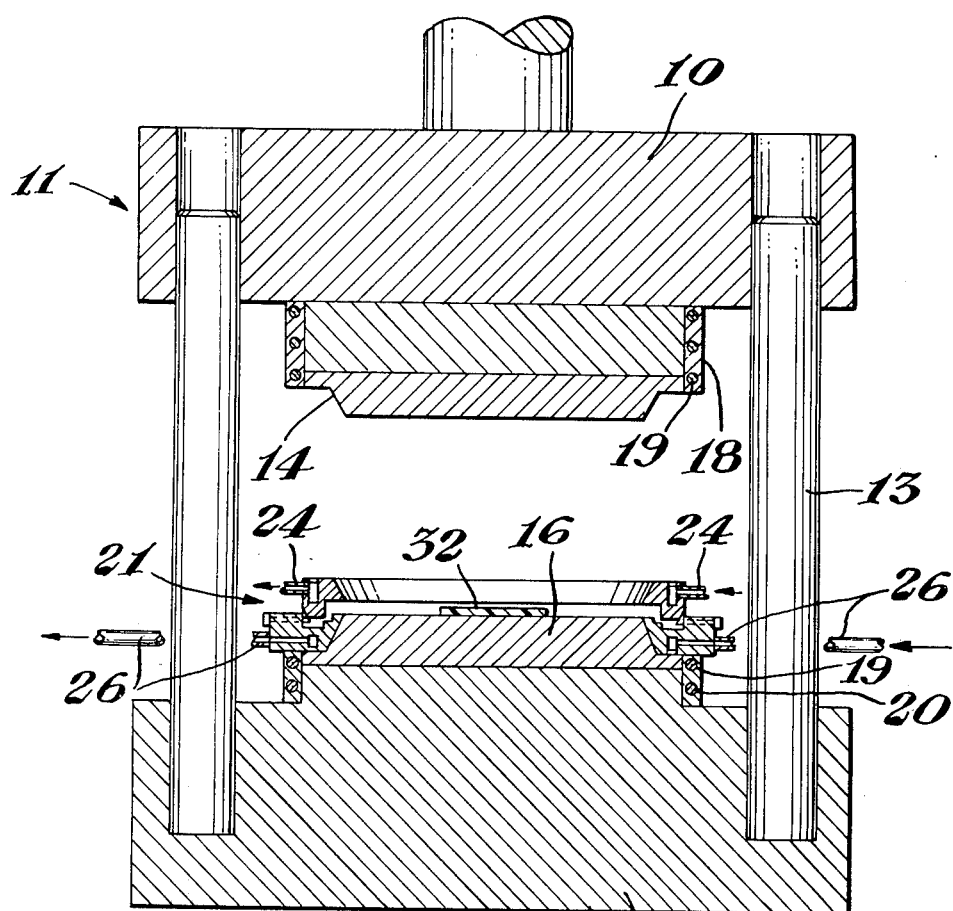
FIG. 1 is a diagrammatic, cross-sectional view of a forging press having heated platens and a cooled lip forming fixture in accordance with the present invention.
Figure 4:
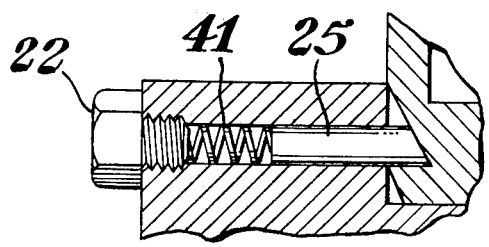
FIG. 4 is an enlarged, fragmentary sectional view of the lip forming fixture illustrating the details of the detent.

Referring more specifically to FIG. 1, 10 is the movable ram of a hydraulic or similar press 11 and 12 is the lower stationary ram of the same press 11. The upper ram 10 is guided during its vertical reciprocating motion by the guides 13 which are fixed into the lower ram 12. The upper ram 10 has a platen 14 secured to it in the center of a heating coil 18 which is provided with pipes 19 to carry a heating fluid such as steam or hot oil. In a similar manner, the lower stationary ram 12 has mounted on it a lower platen 16 which is likewise heated by a heating coil 20 having pipes 19 to carry the heating fluid. On top of the lower platen 16 a lip forming fixture 21 is removably mounted. This lip forming fixture 21 has flexible hoses 24 and 26 to carry a cooling fluid to and from the lip fixture.

Figure 2:
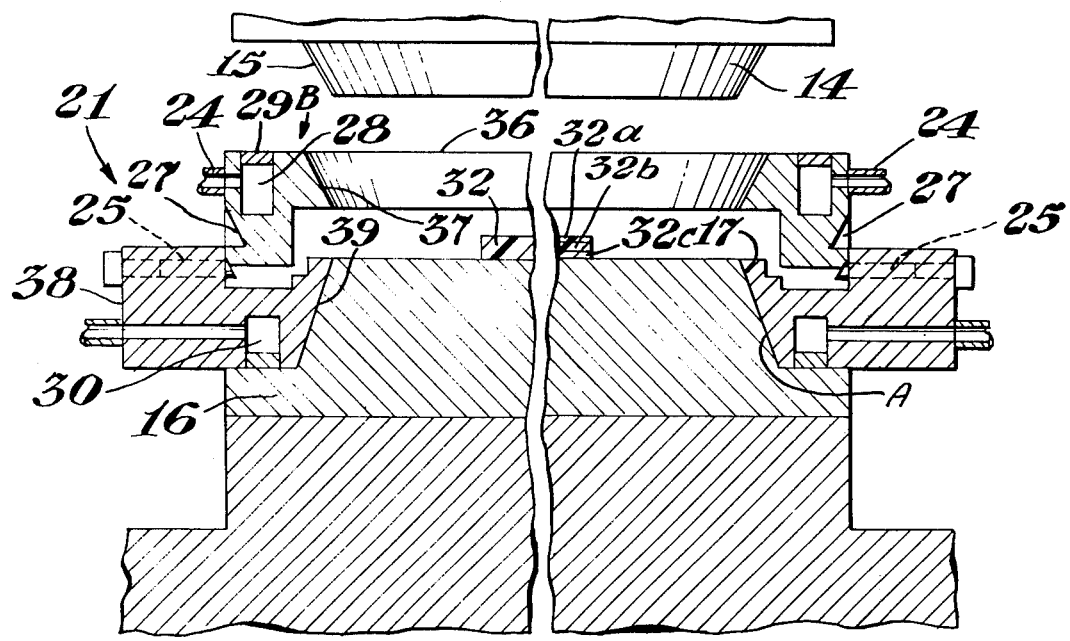
FIG. 2 is a similar view showing enlarged and in greater detail the relationship of the lip forming fixture to the platens of the press and to the blank which is to be forged.

In FIG. 2 the details of the lip forming fixture 21 are shown in greater detail. Thus, the lip forming fixture 21 comprises an upper ring 36 which is contoured at 37 to match the chamfered surface 15 of the upper platen 14 and a lower ring 38 which is likewise contoured at 39 to match the chamfered surface 17 of the lower platen 16. The upper ring is channeled to provide a circumferential cooling channel 28 which is sealed by a sealing ring 29. In similar manner, the lower ring 38 is channeled to provide cooling means in the form of a cooling channel 30 which is sealed by a sealing ring 31. Upper ring 36 adjacent its central opening includes a shoulder or inner surface 61, and adjacent its central opening includes lower ring 38, a shoulder or inner surface 62 and a face 63, which shoulders cooperate in a clamp fashion to firmly engage the top of preform lip 23 and present face 63 angled from the horizontal sufficient to resist the retraction stress of the polymer so that the preform will not pull out of the fixture 21 when the platen 14 is opened. At the same time the function of the clamp results in a finished molded lip about the rim of the preform.

Figure 3:
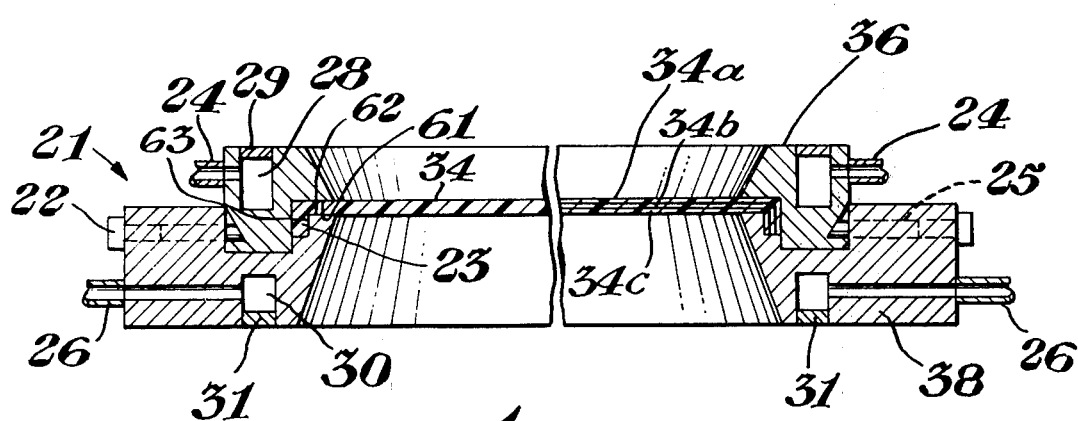
FIG. 3 is a view similar to FIG. 2 showing the relationship of the parts after the blank is forged into a preform.

The upper ring 36 has a plurality of notches 27 cut out of the lower sides thereof. Three of these notches 27 have been found to be adequate for most purposes. However, more or less than this number can be used as is desired. These notches are for the purpose of obtaining a positive lock when the upper ring 36 is depressed into the lower ring 38. During the course of the downward movement of the upper ring 36, the spring detent 25 is pushed back momentarily against a spring 41 and then pushed forward to lock into the notch 27 as is shown in FIG. 3. Associated with the detent 25 is an adjusting screw 22 for adjusting the tension on the spring loaded detent 25. The series of flexible hoses 24 and 26 are provided to carry a cooling fluid such as cold water to the upper ring 36 and the lower ring 38, respectively.

In FIGS. 5 and 6 essentially the same details shown in FIG. 2 are illustrated in exploded and isometric views to further clarify the relationship of the parts. For purposes of clarity, the flexible cooling tubes 24 and 26 are not illustrated in these figures. It is readily apparent that a plurality of these cooling tubes can be provided in order that the upper and lower rings are maintained at a uniform temperature substantially below that of heated platens.

In the steps of this process, a lubricant is applied to the surface of a blank 32 (which can be homogeneous as shown on the left side, or optionally multilayered, as layers 32a, 32b, 32c, for example, on the right side of FIG. 2) or platens of forging fixture 21, the blank 32, which is a measured amount of thermoplastic material, is then preheated in an air oven or other appropriate apparatus to a temperature ranging from just below the softening point to about the melting point of the plastic, and this is then placed on the lower platen 16. The upper ram 10 then descends under pressure to forge the heated blank 32 into the cavity between the platens 14 and 16 and into the adjacent lip forming cavity 23 (shown in FIG. 3) which is formed at the circumferential space between the upper ring 36 and the lower ring 38. The present invention is applicable to blanks regardless of their source, whether they be formed from a piece of sheet, injection, gob or compression molded pieces, sections cut from an extruded rod, or pieces formed from resin powders, or the like.

It is to be understood that the upper and lower platens 14 and 16, respectively, are previously heated to a forging temperature generally above the softening point of the plastic. The temperature of the platens and the blank can be the same or different but it is preferred to have the platens at a slightly higher temperature than the blank. It is also preferred to have the blank 32 preheated in an air oven or a similar device prior to its insertion into the fixture 21.

The platens can optionally be contoured (not shown) so that the forged preform will be correspondingly contoured with the result that the distribution of resin in the preform will permit more uniform drawing of the container. For example, more resin material can be located in that part of the preform from where the bottom corner of the container will be formed. This is readily accomplished whether the preform is homogeneous or multilayered.

The upper platen 14 remains in its lower compressing position for a dwell time just sufficient to cause the peripheral part of the resulting forged preform 34 (which can be homogeneous as shown on the left side, or optionally multilayered as layers 34a, 34b and 34c, for example, on the right side of FIG. 3) to be brought rapidly below the softening point of the plastic by the cooled lip fixture 21 and its associated parts. At the same time, the center portion of said preform remains in a softened state due to the higher temperature of the heated platens 14 and 16.

Figure 7:
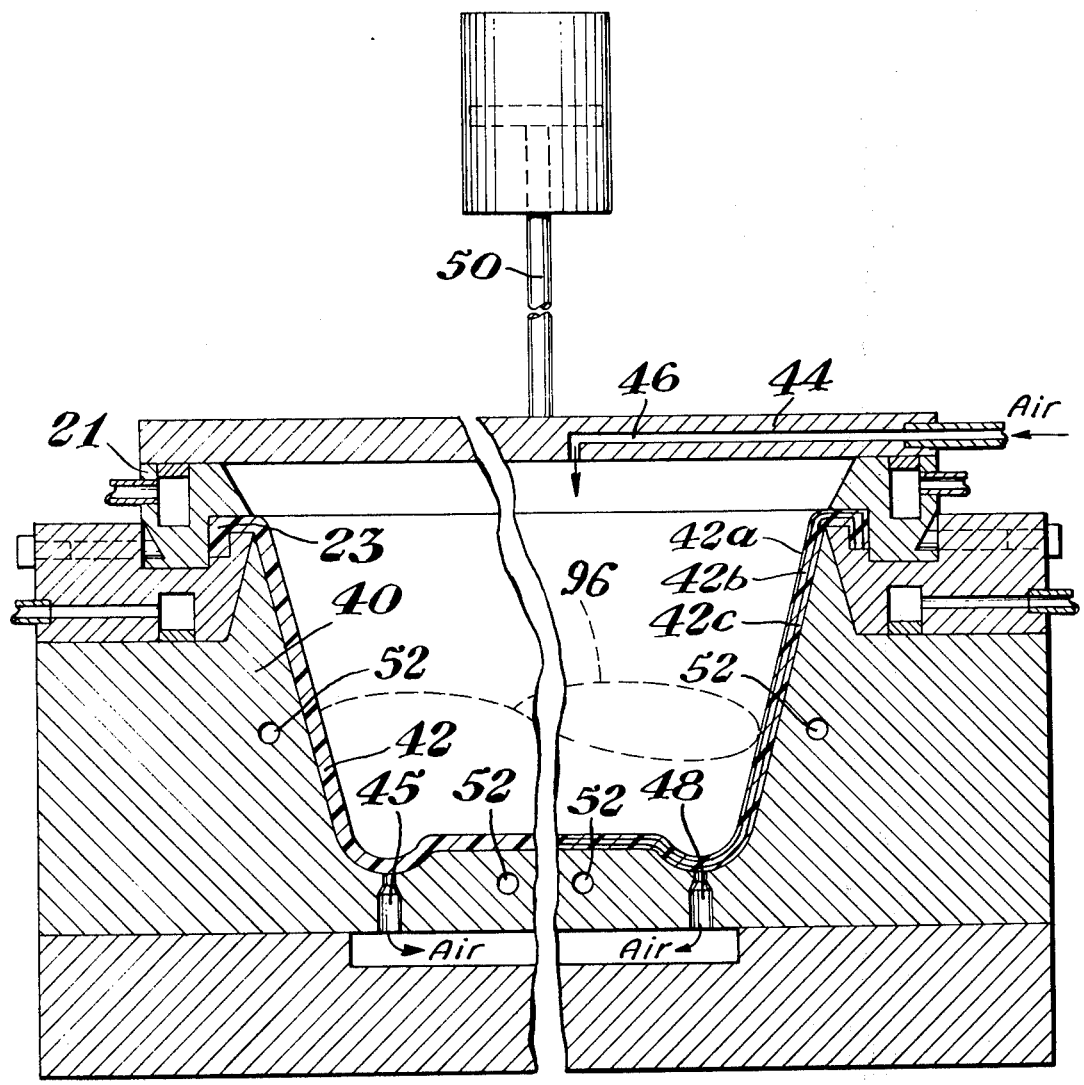
FIG. 7 is a view similar to FIG. 2 only showing apparatus for thermoforming the preform into a container.

The platens 14 and 16 are then withdrawn from the lip forming fixture 21, and the fixture 21 having the preform 34 contained therein is then moved rapidly to a mold 40 wherein a thermoforming operation is preformed to form the preform into the shape of container 42 (which can be homogeneous as shown on the left side, or optionally multilayered, as layers 42a, 42b and 42c, for example on the right side of FIG. 7) including the rim or lip 23 as shown in FIG. 7. A top plate 44 is then clamped to the retaining ring 21 and applies air pressure through aperture 46 to the top of the preform to assist in the thermoforming operation. A vacuum can be drawn through vacuum ports 48 which, in cooperation with positive pressure from the aperture 46, performs the thermoforming function. A plug assist can also be used where an especially deep draw is necessary. A hydraulic mechanism 50 serves to move the top plate 44 up and down to open the cavity for removal of the part, and to close upon the clamp ring to secure the rim 23 in place during thermoforming, respectively. Transfer of a preform occurs while it is still hot moldable so that it can be vacuum formed into the mold 40 and there allowed to cool, and is then subsequently recovered. Cooling passages 52 can be used to assist the solidification of the container 42 in mold 40.

Figure 8:
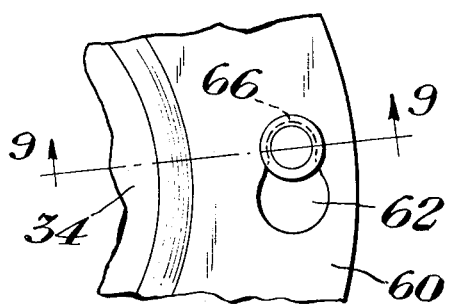
FIG. 8 is a fragmentary plan view of a modified ring clamping device.
Figure 9:
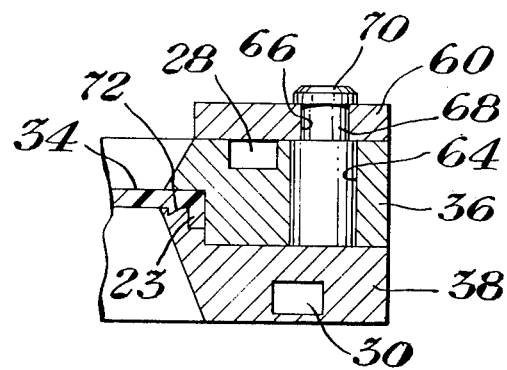
FIG. 9 is a cross-sectional view of the modified clamping device taken along reference line 9—9 of FIG. 8.

Modifications of the apparatus of the present invention are illustrated in FIGS. 8 to 12. Specifically, FIGS. 8 and 9 illustrate a modified clamping mechanism for rings 36 and 38. Here upper ring 36 carries a top plate 60 which has a keyhole slot 62 overlying elongated slot 64 in the upper ring, the width of slot 64 being at least as great as the largest width of keyhole slot 62. The extra plate is carried for ease of machinability of the keyhole slot but, if desired, the entire keyhole slot could instead be located in the upper ring 36, thus eliminating the need for upper plate 60. The narrow neck portion 66 of the keyhole slot 62 has a diameter less than the head 70 of pin 68, the latter being carried in an upstanding position from lower ring 38. The diameter of head 70 is less than the diameter of the widest part of the keyhole slot 62 so that it can be inserted therethrough. By clockwise rotation of the upper ring 36, which carries plate 60, with respect to lower ring 38, the rings can be clamped together. This clamping arrangement can be located repeatedly around the periphery of the rings as necessitated to securely clamp the two rings together, or can be located in ring segments in the event the rings are not continuous about the periphery of the preform rim, that is, where it may be desired not to clamp the preform rim about its entire periphery.

Figure 10:
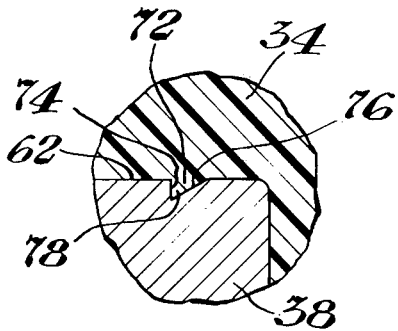
FIG. 10 is an enlarged, fragmentary sectional view of a modified lip retaining feature shown in FIG. 9.

The modification shown in FIG. 9 also includes an extra cut-out 72 in the rim clamping area of lower plate 38, this being shown in more detail in the enlarged view of FIG. 10. The preferred embodiment of the improvement shown in FIG. 10 is of saw-tooth like shape having a face 74 at substantially a right angle to surface 62 of ring 38, with an inclined face 76 angled acutely from the other direction of that same surface. This permits a protrusion 78 of thermoplastic material from the preform 34 to fill the cut-out 72 and to thereby, in combination with the skirt portion 23, secure the peripheral rim area of the preform within the forming fixture. Sharply angled face 74 provides resistance to pull-out of the preform periphery from the forming fixture. While the configuration of face 76 is not particularly critical, it is important that the face 74 be at a relatively sharp angle with respect to the surface 62. The faces themselves need not necessarily be flat to function. Thus, the actual form of the cut-out, and the actual location and number of the cut-outs, can vary provided the function of sufficiently resisting pulling of the rim periphery from the fixture is accomplished.

Figure 11:
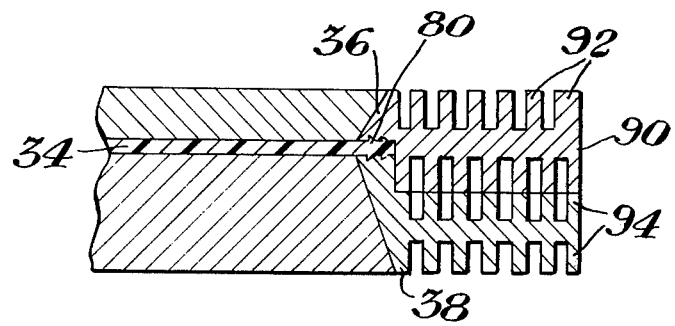
FIG. 11 is a fragmentary sectional view of a modified ring cooling and yet another lip retaining feature.
Figure 12:
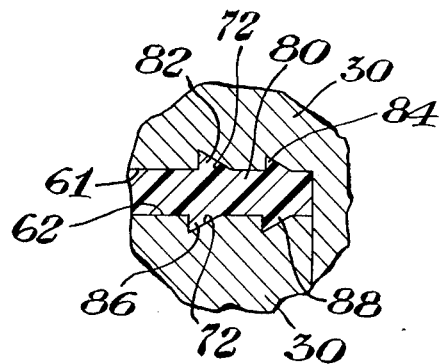
FIG. 12 is an enlarged, fragmentary sectional view of the lip retaining feature shown in FIG. 11.

An alternate form of preform rim clamping is shown in the preferred embodiments of FIGS. 11 and 12 wherein the lip 80 of the preform 34 extends laterally outwardly from the central body portion of the preform. Since the lip 80 in this case does not include a downwardly extending skirt, reliance is made of several protrusions, such as 82, 84, 86 and 88, which are like protrusion 78. The cut-outs for protrusions 82 to 88 are like cut-out 72, and, as illustrated, they extend from both surfaces 61 and 62 of each of the clamping rings 36 and 38. The protrusions can be located directly opposite from one another, such as protrusions 84 and 88, or can be staggered laterally with one another, such as protrusions 82 and 86, in cases where this can be an advantage. In any event, the total effect of the protrusions 82 through 88 should be sufficient with the clamping force of the rings themselves, to fully resist pulling of the preform 34 from the clamping rings of the forming fixture. Again variations can occur in shape, number and location of protrusions, provided the desired clamping function is achieved.

Also illustrated in the modification of FIG. 11 is a modified cooling means or heat exchanger 90 for the clamping rings 36 and 38. This embodiment of cooling means 90 comprises a plurality of radiating fins 92 and 94 in a row extending laterally outwardly from the periphery of the clamping rings, the fins being constructed such that they provide large surface areas exposed to the atmosphere for radiation. In many cases such a radiation cooling means can be adequate so that it is unnecessary to provide more elaborate cooling means receiving cooling liquid and the like.

The use of lubricants on the blanks or on the platen surfaces or both is necessary in this invention to insure that the plastic flows uniformly into the mold cavity and to avoid warping. It has been found that without the use of lubricants, a laminated sheet will not flow uniformly into the cavity but that the internal layer or core will be substantially extruded ahead of the outer surfaces of the laminate so that partial or complete disruption of the laminates takes place. In other words, the lubricant permits "plug flow" of the blank (i.e., flow approaching the uniform velocity profile of the polymer cross-section) into the shape of the preform. Illustrative examples of lubricants that can be used are glycerine, fatty acid soaps, paraffin waxes, silicones, thermoplastic films, oils, and the like.

The "plug flow" resulting from the lubrication in turn permits the preform to be distortion printed prior to thermoforming into a container.

Since the thermoplastic resins that may be used in this invention are quite varied, it is obvious that the terms "forging temperature", "thermoforming temperature", "softening point", and "melting point" used herein are relative terms and cannot be defined specifically without considering the characteristics of each resin employed in the process. Laminates of two or more plastics will have different forging temperatures, softening points, melting points, etc., than their component parts. Generally it has been found that the softening temperature of a laminate is dominated by the softening temperature of the surface layer in contact with the mold surface. For a given thermoplastic material, optimum forging temperature can be determined in accordance with accepted techniques by following the principles of this invention. The pressure ranges used in the forging step are quite variable according to the plastic which is to be forged and to the temperature to which it is heated and to the dimensions of the cavity at the mold lip.

It is essential to the success of this invention when using multilayer blanks that at least three conditions be obtained before the plastic blank is forged; (1) the blanks must be warm, i.e., preheated to a temperature ranging from just below its softening point to about its melting point depending on the particular resin in the blank; (2) the blank and/or the mold (i.e., platen)

surfaces must be lubricated; and (3) the mold surfaces must be warm, i.e., heated to a temperature above the softening point of the resin of the blank.

As illustrations of the criticality of the foregoing conditions, it was observed that if the mold surfaces were cold, i.e., at room temperature, and the multilayer blank was heated to a forging temperature and no lubrication was used, the center layer of layers were squeezed out of the multilayered blanks. Even when lubricants were used under the above conditions, there was considerable extrusion of the middle layer or layers.

When both the blank and the mold were heated to a forging temperature and no lubrication was used, there was still extrusion of the middle layers. It was only when all three of the above conditions were observed that uniform preforms were obtained from the multilayer blanks.

When the process was applied to the homogeneous plastic blank, i.e., a blank made from a single plastic sheet, the above conditions are not as critical, but is preferred to use them since by so doing the process is much faster and springback or warpage of the resultant container is eliminated.

EXAMPLES

The invention is further illustrated by the following examples.

Quantities of high impact polystyrene containing 5 per cent styrene-butadiene rubber were compression molded or extruded into sheets of about 100 mils in thickness. Some of these sheets were then tentered and biaxially oriented at various temperatures as indicated in Table I. Square blanks of about 2–3 inches square were then cut from these sheets and forged into generally circular preforms and containers having a circular horizontal cross-section with a maximum diameter of five inches and a depth of 1-½ inches, with outwardly sloping side walls in the manner indicated above. The results are indicated in Table I. In each Example of Table I the softening temperature was about 205° F., the melting temperature (usually not a definite point) was in the range of 300° F. to 550° F., and the forging temperature (temperature of forging platens) was about 265° F. In each example it can be seen that the blank preheat temperature (from Table I) was in the range of from just below the softening temperature to about the melting temperature of the resin of the blank, and the forging temperature was at least as high as the softening temperature of the resin.

container was always opaque but did have improved strength and stress crack resistance due to orientation resulting from forging of the blank into a preform, and subsequent thermoforming of the preform into a container. If at least a moderate amount of orientation was present in the blank a generally transparent container usually resulted, and this container had greatly improved strength and stress crack resistance. The upper limit on the amount of orientation is determined by the physical characteristics of the lip forming fixture. For example, for every lip forming fixture there will be a point at which the stresses induced into an oriented blank are greater than the ability of the fixture to hold the lip of the resultant oriented preform when it is attempted to squeeze the blank into a preform. This is believed to be due to the fact that heat is transferred from the mold which then causes the blank to shrink and revert back to its original unoriented size and shape, i.e., the "memory effect". In certain instances where some polymers are under high stress, the polymers heat distortion temperature may be decreased somewhat.

From the data presented in Table I it is evident that the process of this invention always produces a container having orientation greater than that of the blank from which it is formed with the added advantage that if the blank is opaque, due to the presence of small amounts of impact improvers such as various rubbers, the container usually will also be rendered generally transparent.

A summary of physical properties in a series of tests of sheet, preforms and containers when starting from sheets of different levels of orientation, where the containers are formed according to this invention, are set forth in Table II, the results clearly showing a dramatic increase in tensile strength for a given polystyrene material through the steps of the process and also as the orientation of the original sheet is increased. This increased orientation also contributes to highly improved stress crack resistance of the resulting polystyrene container, the relationship between increased orientation and stress crack resistance being well established. The physical properties of the sheet stock from which squares were cut, the 5-⅛ inch diameter preforms and the former containers of Table II were all tested for tensile strength and percent of elongation by A.S.T.M. Method D1708-66 (Tensile Properties of Plastics by Use of Microtensile Specimens). I-shaped test bars were cut in the radial and tangential direction from the flat sections of the preform and the formed containers,

TABLE I

| Example No. | Blank Orientation Conditions | Transparency of Sheet | Birefringence* Sheet | Birefringence* Container | Transparency of Sheet | Range of Preheat Temperature of Blank |
|---|---|---|---|---|---|---|
| 1 | Not oriented | Opaque | 0 | $4 \times 10^{-3}$ | Opaque | 240°–260° F. |
| 2 | Stretched | Opaque | $1.2 \times 10^{-3}$ | $12 \times 10^{-3}$ | Transparent | 175°–190° F. |
| 3 | Stretched | Opaque | $2.2 \times 10^{-3}$ | $14 \times 10^{-3}$ | Transparent | 175°–190° F. |
| 4 | Stretched | Opaque | $4.1 \times 10^{-3}$ | Not tested | Transparent | 175°–190° F. |
| 5 | Stretched | Opaque | $7.9 \times 10^{-3}$ | No containers made due to inability of fixture to retain preform | — | 175°–190° F. |

*Index of orientation determined from fringe patterns under a polarized microscope with monochromatic light by the method of E. F. Gurnee Jour. of Applied Physics 25:1232-30 (1954)

In similar examples of the present invention, it was found that when a blank having no orientation was used to form a container according to this invention the container and also from the sidewall of the formed container. In most cases, data for any one preform or container was averaged and reported as a single value.

TABLE II

| Properties of the Blank | Example 1 Polystyrene Unoriented Blank | Example 2 Polystyrene Biaxially Oriented Blank | Example 3 Polystyrene Biaxially Oriented Blank |
|---|---|---|---|
| *Birefringence | 0 | $1.2 \times 10^{-3}$ | $2.2 \times 10^{-3}$ |
| TS at Yield | 3810 psi | 4090 psi | 4320 psi |
| TS at Rupture | 2950 psi | 4310 psi | 4800 psi |
| Elong. at Rupture | 35% | 39% | 22% |
| Properties of the 5⅛" Dia. Preform | | | |
| *Birefringence | $1.05 \times 10^{-3}$ | $3.4 \times 10^{-3}$ | $5.2 \times 10^{-3}$ |
| TS at Yield | 4310 psi | 5500 psi | 6650 psi |
| TS at Rupture | 4390 psi | 6850 psi | 6950 psi |
| Elong. at Rupture | 38% | 43% | 60% |
| Properties of the 5⅛" Dia. × 1½" Deep Formed Containers | | | |
| *Birefringence | $4.0 \times 10^{-3}$ | $12 \times 10^{-3}$ | $14 \times 10^{-3}$ |
| TS at Yield | 5690 psi | 8740 psi | 10,080 psi |
| TS at Rupture | 6660 psi | 9100 psi | 10,440 psi |
| Elong. at Rupture | 50% | 32% | 27% |

"*Birefringence" is defined in Table I
"TS" means tensile strength of section from Example
"Elong." means elongation of section from Example The above process was applied to multilayered sheets of varying composition and under varying conditions to form an essentially pinhole free circular container having a diameter of 5-⅛ inches, a depth of 1-½ inches and outwardly sloping side walls. The conditions and results are indicated below in Table III. In each of the five examples, the multilayered sheet was coextruded with a glue layer of a commercially available ethylene-vinyl acetate copolymer having a melt index of 6.0 and 28% vinyl acetate.

The results of the oxygen permeability test support the conclusion that the saran layer was continuous and essentially free of flaws since the value obtained are in good agreement with the calculated values for saran of the same thickness. Such items find especial use in containers for products having extreme sensitivity to oxygen penetration such as meat packages, latex paints, cheese, cooking oil and many other food products.

example, oleomargarine tubs can be made by this process from impact modified polystyrene which will have good resistance to the fatty oils of the oleomargarine by virtue of the orientation built into the tub by this process.

By using a white pigmented impact polystyrene sheet, e.g., one containing 1–5% by weight of finely divided titanium dioxide or other white pigments, in addition to styrene-butadiene rubber which has been laminated to an impact polystyrene sheet which has been pigmented with a contrasting pigment such as carbon black, one can obtain oleomargarine tubs or other food containers which are extremely attractive in that the inner surfaces are white while the outer surfaces are black or other colors. These containers, in addition to being attractive, are impact and stress craze resistant due to the orientation built into them by this process.

It should also be appreciated that the concepts of the present invention can be employed in rapid forming of

TABLE III

| Example | Compositions | Square Blank Size | Approximate Saran Thickness in Blank (Mils) | Blank Thickness (Mils) |
|---|---|---|---|---|
| 6 | MIPS/S/MIPS | 2⅝" | 13.2 | 110 |
| 7 | MIPS/S/MIPS | 3⅛" | 9.6 | 95 |
| 8 | GPPS/S/GPPS | 2⅝" | 11.8 | 110 |
| 9 | GPPS/S/GPPS | 3⅛" | 11.0 | 110 |
| 10 | HDPE/S/HDPE | 3⅛" | 5.4 | 85 |

MIPS: Medium impact polystyrene (3.5% styrene-butadiene rubber)
GPPS: General purpose polystyrene (no rubber present)
S: Saran (vinylidene chloride/vinyl chloride copolymer)
HDPE: High density polyethylene 0.959 density 0.5 melt index

| Example | Preheat Temp. °F. | Forge Temp. °F. | Press Dwell (Sec.) | Avg. Saran Thick. at Bottom of Container (Mils) | Oxygen Transmission Rate Mesr'd* | Oxygen Transmission Rate Calc'd |
|---|---|---|---|---|---|---|
| 6 | 260 | 260 | 1 | 2.0 | 0.78 | 0.50 |
| 7 | 260 | 260 | 1 | 2.4 | 0.49 | 0.42 |
| 8 | 260 | 260 | 1 | 2.0 | 0.66 | 0.50 |
| 9 | 260 | 260 | 1 | 2.9 | 0.34 | 0.34 |
| 10 | 275 | 300 | 1 | 1.1 | 0.63 | 0.91 |

*c.c./100 in.² - 24 hours - atmosphere (of samples cut from the bottom of the formed container)
Mesr'd means "Measured"
Calc'd means "Calculated"

From the foregoing, it is evident that the process of this invention can be used to produce oriented containers with good stress craze resistance having one or more layers of the same or different polymers. For preforms with finished rims, which preforms can be cooled once forged and stored for later use. When ready to be used the preforms can then be reheated and thermoformed into containers. This would be a readily inexpensive and highly practical way to obtain, for example, multilayered highly oriented preforms which can later be formed into especially advantageous containers of the type heretofore described.

It should additionally be appreciated that what we have heretofore called "preforms" can themselves be the final article, that is, an item requiring no further thermoforming. For example, a lid with a finished rim could be made in the same manner as the preform.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. An apparatus for scrapless forming of thermoplastic articles comprising a ring-like forming fixture adapted to receive a measured amount of thermoplastic material to be forged into a preform which can subsequently be thermoformed into an article, said forming fixture comprising an upper ring with a central opening the lower extent of which defines a peripheral dimension about the same as that of said preform less its rim area, a lower ring including a central opening the upper extent of which defines a peripheral dimension about the same as that of said preform less its rim area, a lip opening contoured out of at least one of said rings around the entire extent thereof and presenting a face angled from the horizontal sufficient to resist the retraction stress of the thermoplastic material of the preform, the inner surfaces of said rings adjacent their respective central openings being spaced from one another a distance no greater than the thickness of said preform and presenting opposed shoulders which together with said face secure the peripheral rim area of said preform, including its lip, in clamped fashion within said fixture prior to and during subsequent thermoforming of the preform into a container, cooling channels extending through at least one of said rings adjacent the rim receiving portion thereof sufficient to cool rapidly the rim area while leaving the central portion of said preform at a thermoformable temperature, the peripheral edges of said central openings being chamfered outwardly from their inner extent to their outer extent, the inner extent of said central openings being in open communication with one another, a vacuum thermoforming mold including a cavity generally in the shape of a desired container located in open communication with the central openings, means within said mold for evacuating fluid under vacuum therefrom, and means for cooling the container thermoformed from said preform.

2. The apparatus of claim 1 wherein a top platen is secured across the central opening of said upper ring, and including a fluid passageway for introducing fluid under pressure to assist in the thermoforming of said preform.

3. An apparatus for scrapless forming of thermoplastic articles comprising a ring-like forming fixture adapted to receive a measured amount of thermoplastic material to be forged into a preform which can be subsequently thermoformed into an article, said forming fixture comprising an upper ring with a central opening the lower extent of which defines a peripheral dimension about the same as that of said preform less its rim area, a lower ring including a central opening the upper extent of which defines a peripheral dimension about the same as that of said preform less its rim area, a lip opening contoured out of at least one of said rings around the entire extent thereof and presenting a face angled from the horizontal sufficient to resist the retraction stress of the thermoplastic material of the preform, the inner surfaces of said rings adjacent their respective central openings being spaced from one another a distance no greater than the thickness of said preform and presenting opposed shoulders which together with said face secure the peripheral rim area of said preform, including its lip, in clamped fashion within said fixture prior to and during subsequent thermoforming of the preform into a container, cooling channels extending through at least one of said rings adjacent the rim receiving portion thereof sufficient to cool rapidly the rim area while leaving the central portion of said preform at a thermoformable temperature, the peripheral edges of said central openings being chamfered outwardly from their inner extent to their outer extent, the inner extent of said central openings being in open communication with one another, means located within said central openings for forging said thermoplastic material into said preform, said means comprising upper and lower platens adapted to fit within the chamfered openings within said upper and lower rings, respectively, and including means for driving said platens together to squeeze said thermoplastic material into said preform, said upper and lower platens located within said central openings for forging said thermoplastic material into said preform, the thermoplastic material engaging surfaces of said platens being contoured to distribute material in said preform for more uniform thermoforming of said preform into a container, a reciprocating plug secured across the central opening of said upper ring and movable into said thermoforming mold to assist the vacuum in forming said container.

4. An apparatus for scrapless forming of a thermoplastic article having a rim area with a finished molded lip, said apparatus comprising a forming fixture adapted to receive a measured amount of thermoplastic material to be forged into said article, said forming fixture comprising a first clamp means with a central opening defining a peripheral dimension about the same as that of said article less its rim area, a second clamp means including a central opening defining a peripheral dimension about the same as that of said article less its rim area, a lip opening contoured out of at least one of said clamp means at least partially about the extent thereof, said lip opening including a cut-out presenting a face at an angle to the clamp means surface sufficient to enable the thermoplastic material of the article to resist the retraction stress of the thermoplastic material, inner surfaces of said clamp means adjacent their respective central openings being spaced from one another a distance sufficiently close to the thickness of said article to assist in resisting said retraction stress and presenting opposed shoulders which together with said lip opening secure the peripheral rim area of said article in clamped fashion within said fixture, a vacuum thermoforming mold including a cavity generally in the shape of a desired container and located in open communication with the central openings, means within said mold for evacuating fluid under vacuum therefrom, and means for cooling the container thermoformed from said preform.

* * * * *